Sept. 8, 1925.

B. F. KILER

GOPHER TRAP

Filed May 3, 1924

1,553,085

INVENTOR
Benjamin F. Kiler
BY
ATTORNEY

Patented Sept. 8, 1925.

1,553,085

UNITED STATES PATENT OFFICE.

BENJAMIN F. KILER, OF LINDEN, CALIFORNIA.

GOPHER TRAP.

Application filed May 3, 1924. Serial No. 710,780.

*To all whom it may concern:*

Be it known that I, BENJAMIN F. KILER, a citizen of the United States, residing at Linden, county of San Joaquin, State of California, have invented certain new and useful Improvements in Gopher Traps; and I do declare the following to be a full, clear, and exact description of the same, reference being had to the accompanying drawings, and to the characters of reference marked thereon, which form a part of this application.

This invention relates to improvements in gopher catching traps such as are inserted in the gopher holes; my principal object being to provide a trap for the purpose so constructed that it may be easily adjusted to fit any sized hole, and when so adjusted, will be automatically set to trap and hold any gopher whose length is in proportion to his width or girth as determined by the diameter of the hole.

My trap does not merely imprison the gopher, but seriously wounds if not actually kills the animal, and the catching jaws of the trap, sprung by the gopher, will always grip a vital part of its anatomy, regardless of the length of the animal, if the trap is first adjusted and set to fit the hole into which the trap is to be inserted, as above stated.

In other words, there is no chance for a small gopher to be merely imprisoned or for a large one to escape the jaws. Both will be positively caught and held.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
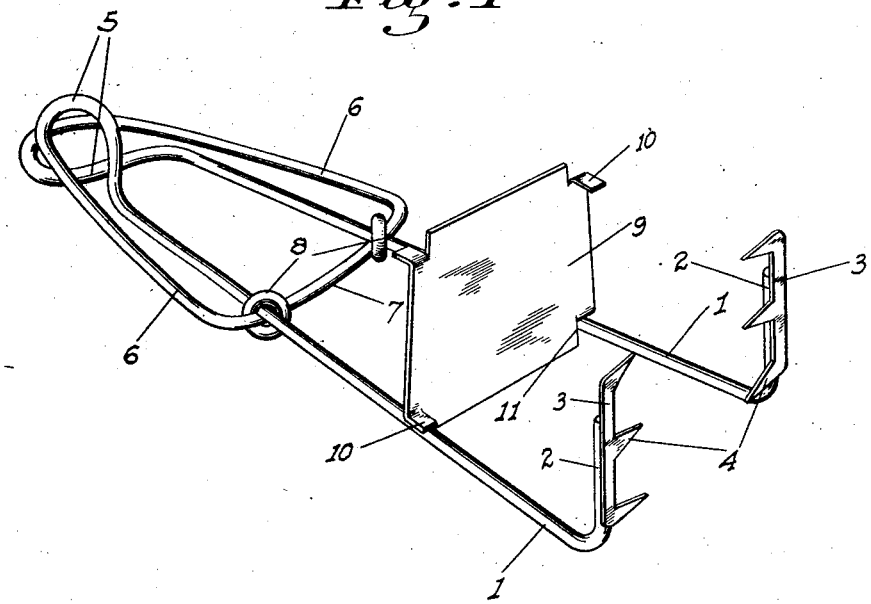
Fig. 1 is a perspective view of the trap in a set position.
Figure 2:
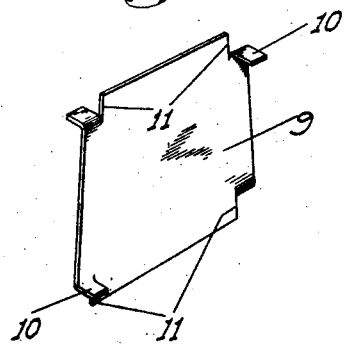
Fig. 2 is a detached view of the combined hole closure and trigger plate.

Referring now more particularly to the characters of reference on the drawings, the numeral 1 denotes a pair of transversely spaced horizontal arms, each having a right angle or vertical bend 2 at one end, the bends being parallel to each other and having fixed thereon opposed jaw members 3 which are provided with transversely disposed teeth or prongs 4 facing each other.

The opposite ends of the arms 1 are bent to form superimposed and horizontally disposed loops 5 from whose ends opposite to said arms extensions 6 project toward the jaws for a certain distance, said extensions being joined at their forward ends by a cross bar 7. This cross bar projects across the arms 1 on the same side thereof, said arms being slidably connected to the bar by means of guide rings 8 freely encircling the arms and cross bar.

The parts 1, 5, 6, and 7 are made from a single piece of heavy spring wire arranged to cause the arms 1 to normally approach each other at their free ends.

By reason of the extension and crossbar arrangement formed as part of the spring structure, a very strong spring action is had without using very heavy material, and at the same time the arms are braced intermediate their ends against vertical deflection while at the same time they are free to have the necessary transverse movement.

To spread the jaws and hold the same set I employ a combined trigger and hole closure member in the form of a vertical plate 9 having horizontal lugs or ears 10 bent at right angles thereto at the ends of its upper and lower edges, the lugs of each pair being disposed in opposed relation to each other. The lugs being cut and bent from the plate-piece itself, vertical shoulders 11 are formed on the plate at the inner edges of the lugs, the transverse spacing between the two pairs of shoulders being different from each other.

In operation, the jaws of the trap are first inserted into the gopher hole. The plate 9 is then applied to the arms 1 with a pair of the lugs 10 abutting against the arms and with the corresponding shoulders between said arms, the plate lying on the same side of the arms as are the jaws 3.

By then moving the plate lengthwise of the arms one way or the other, the distance between the jaws will be increased or decreased as the case may be. If the hole is small, as would be made by a small and short gopher, the distance from the plate to the jaws will be correspondingly less than would be the case with a large hole made by a large and long gopher. The position of the plate relative to the jaws, and which is determined by the size of the hole, is therefore proportionate to the length of the gopher, so that with the head of the latter adjacent the plate 9, the jaws when released will grip the gopher adjacent its vital organs. The two sets of shoulders on the plate being of different spacing, a great range of spread of the jaws may be had, as will be evident.

With the trap thus set and inserted so that the plate 9 is within the hole, the gopher in the latter must approach the plate from the jaw end of the trap, and to reach the plate must pass the jaws, which with the arms are sufficiently inconspicuous as not to arouse the instinctive suspicion of the gopher.

Upon the gopher reaching the plate and attempting to press this obstruction to his passage out of the way, the plate will be tilted about one or the other of the lugs 10, with the result that the arm engaging shoulders become freed from the arms, allowing the latter to come together and of course causing the jaws to close upon the gopher.

By reason of the fact that the lugs 10 face in opposite directions, it makes no difference in setting the trap which side of the plate faces the jaws. Should the plate tend to slip too easily on the arms, the faces of the latter may be roughened in any suitable manner without interfering with the ready release of the plate.

The spring loops 5 provide means for enabling a holding peg being placed therethrough and driven into the ground to prevent possible displacement of the trap.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A gopher trap comprising a pair of vertical and oppositely disposed jaws, horizontal arms extending from one end thereof, each arm at its end opposite to the jaws being formed with a spring loop and then doubling back on itself a certain distance, connecting means between the ends of the last named arm portions farthest from the loops, and means interposable between the first arm portions for holding the jaws spread.

2. A gopher trap comprising a pair of vertical and oppositely disposed jaws, horizontal arms extending from one end thereof, each arm at its end opposite to the jaws being formed with a spring loop and then doubling back on itself a certain distance, an integral connection between the ends of the last named arm portions farthest from the loops, and means interposable between the first arm portions for holding the jaws spread.

3. A gopher trap comprising a pair of vertical and oppositely disposed jaws, horizontal arms extending from one end thereof, each arm at its end opposite to the jaws being formed with a spring loop and then doubling back on itself a certain distance, connecting means between the ends of the last named arm portions farthest from the loops, guide and connecting means about said first named connecting means and the first named arm portions, and means interposable between the first named arm portions and intermediate the guide means and jaws for holding the latter spread.

In testimony whereof I affix my signature.

BENJAMIN F. KILER.